Sept. 19, 1950  F. S. PRICE  2,522,960
DRIVE DEVICE
Filed Nov. 14, 1949
FIG. 1.
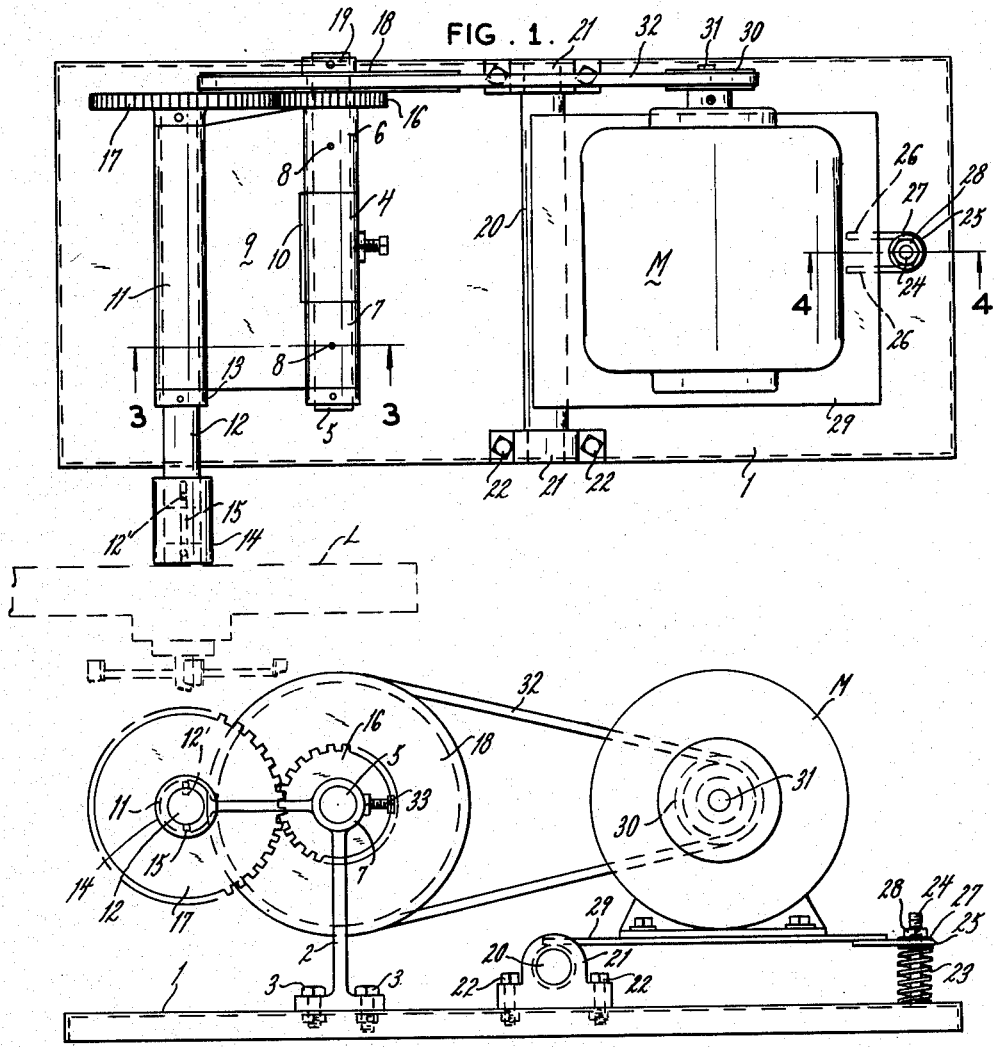
FIG. 2.
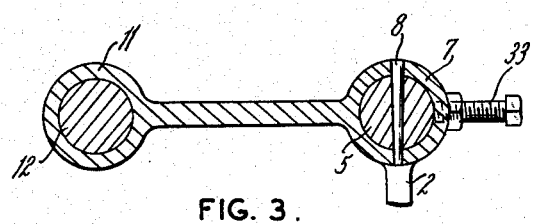
FIG. 3.
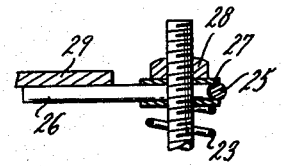
FIG. 4.
INVENTOR
FREDERICK S. PRICE
BY *J. S. Cook*
ATTORNEY Patented Sept. 19, 1950

2,522,960

UNITED STATES PATENT OFFICE 2,522,960

DRIVE DEVICE

Frederick S. Price, St. Louis County, Mo.

Application November 14, 1949, Serial No. 127,063

4 Claims. (Cl. 51—26)

This invention relates to drive devices, and particularly to such a device for use in sharpening lawn mower blades. The principal object of the invention is to produce a drive device which is portable and which can be adjusted to sharpen the blades of mowers of various sizes, the most important feature thereof being its adjustability as to height to suit any type of lawn mower. Another advantage of my device is the ease and speed with which this adjustment can be made, that is, by merely loosening a screw and moving to the desired position a shaft which supports a portion of the mechanism and then tightening said screw to retain the rod in that position. As far as I am aware, I am the first to incorporate this feature of adjustability in a device of this type. Another advantage of my invention is the simplicity of its construction, embodying few parts and those of such a nature as to withstand long usage without the necessity of repairs or replacements.

In the drawing—

Fig. 1 is a top plan view of my drive device as it appears in operative position, and in association with a motor.

Fig. 2 is a side elevation of the device, illustrating particularly the motion transmitting mechanism and the adjusting means.

Fig. 3 is an enlarged, cross-sectional view taken on line 3—3, Fig. 1.

Fig. 4 is an enlarged, cross-sectional view taken on line 4—4, Fig. 1.

The invention comprises a base 1, on which is mounted a rigid, vertical support 2 which is bolted to the base as shown at 3. A hollow cylinder 4 is rigidly mounted on the support 2 and at a right angle thereto, and a shaft 5, rotatably positioned in the cylinder 4, extends outwardly beyond both ends of said cylinder. On the outwardly extending ends of the shaft 5 there is mounted a pair of collars 6 and 7, respectively, which are secured to the shaft by pins 8 and are rotatable with the shaft.

A plate 9 extends outwardly from the collars 6 and 7 to which it is rigidly secured, so that it is movable therewith upon rotation of the shaft 5, said plate 9 being approximately as wide as the combined width of the cylinder 4 and the collars 6 and 7, and said plate 9 is cut out, as shown at 10, to permit it to move freely about the stationary cylinder 4.

At the outer free end of the plate 9 a horizontally disposed cylinder 11 is welded thereto. A rotatable shaft 12 is positioned in the cylinder 11 and extends outwardly beyond each end of said cylinder, and adjacent one end of said cylinder 11 a retaining collar 13 is rigidly secured to the shaft to hold the cylinder 11 in place. The shaft 12 is of such length as to extend outwardly a considerable distance beyond the collar 13, as seen most clearly in Fig. 1, and a hollow coupling 14 is mounted on the long, outer end of said shaft. The coupling is provided with grooves 15 on its interior wall which are adapted to engage retaining pins 12' on the shaft 12, said coupling being adapted to connect the shaft 12 with the mechanism of the lawn mower L.

On the shaft 5 and adjacent the collar 6 there is mounted a gear wheel 16 which rotates on the shaft 5, and another gear wheel 17, of larger diameter, is mounted on the shaft 12 and rotatable therewith, the gear wheels 16 and 17 being in engagement with each other. Also mounted on the shaft 5 and rotatable thereon I provide a pulley 18 which is positioned between the gear wheel 16 and a bearing 19 secured to the shaft 5 as a retaining member for the pulley 18, the gear wheel 16 and pulley 18 being secured together. From the above it will be understood that both the gear wheel 16 and the pulley 18 are rotatable on the shaft 5, but the bearing 19 is stationary thereon.

A shaft 20 is rotatably mounted in a pair of bearings 21 which are secured to the base 1 by means of bolts 22, said bolts and the shaft therein being spaced away a slight distance from the support 2, as seen in Figs. 1 and 2. Near the end of the base 1 which is closest to the shaft 20 I provide a spiral spring 23 which surrounds a vertical post 24 rising from the base 1, said post 24 being screwthreaded at its upper portion. A U-shaped element 25 has its rounded end in engagement with the upper portion of the post 24 and resting upon the spiral spring 23, and the legs 26 of said element 25 extend inwardly. Above said U-shaped element a washer 27 is positioned on the post 24, and a threaded nut 28 is screwed onto the upper portion of said post above the washer 27, so that when the nut 28 is screwed down it will depress the U-shaped element 25 by virtue of its position on the spiral spring 23.

A platform 29 rests upon and is secured to the legs 26 of the U-shaped element 25 and also to the rotatable shaft 20, and a motor M of any preferred type rests upon and is secured to the platform 29. A pulley 30 is mounted upon the motor shaft 31 and rotates therewith, and a belt 32 connects the pulleys 18 and 30, the pulley 30 being of considerably smaller diameter than the pulley 18.

In operation the procedure is as follows:

The lawn mower is attached to my drive device through the agency of the coupling 14, and in order to accomplish this the cylinder 11, in which the shaft 12 is positioned, is moved to the required height, carrying the coupling 14 with it. This movement of the cylinder 11 is transmitted to the collars 6 and 7 through the plate 9, the shaft 5 being rotated at the same time, and the shaft is then locked at the resultant position by screwing tight the bolt 33 which extends through the cylinder 4 to the shaft 5. It will be understood from the above that this locks the shaft 12 and the coupling thereon at the correct height for attachment to the lawn mower.

The motor M is now started, and as the motor shaft 31 rotates, the pulley 30 rotates therewith in a clockwise direction, and this motion is transmitted through the belt 32 to the pulley 18 and to the gear wheel 16 attached thereto. As the gear wheel 16 rotates in a clockwise direction, the gear wheel 17, which is in association with the gear wheel 16, is rotated in a counterclockwise direction, and this movement is transmitted to the shaft 12 and thence to the mechanism of the lawn mower secured thereto by the coupling 14.

The mechanism of the lawn mower forms no part of this invention, but it is well known that the blades of a mower perform their shearing function through a lapping movement in a clockwise direction against the cutter bar of the mower. When coupled to my device as above described, this clockwise movement of the lawn mower blades is reversed, so that they strike the cutter bar with a counterclockwise lapping movement. The cutter bar of the lawn mower has previously been covered with a gritty substance, and as the blades move against the cutter bar as above described, they are sharpened through the agency of the gritty substance on the cutter bar.

The motor M usually operates at a speed which is greater than desired, and this speed is reduced by virtue of the difference in diameter between the two pulleys 30 and 18, and is still further reduced by the difference in diameter between the gear wheels 16 and 17. In order to obtain the best results, the belt 32 must be kept taut. Through continued use the belt may become loosened, and in order to tighten it the bolt 28 is screwed down on the U-shaped element 25, and the pressure thus exerted on the spring 23 permits said U-shaped element to be lowered. This results in a lowering of the platform 29, which movement is facilitated by its attachment to the rotatable shaft 21, and consequently the motor M and its shaft 31 are also lowered, thus increasing the tension of the belt 32.

When the lawn mower blades have been sufficiently sharpened, the motor M is stopped and the mower may be uncoupled from the drive device through release of the coupling 14.

I claim:

1. A drive device for engagement with a lawn mower to sharpen the blades thereof and including a motor having a shaft rotatable in a clockwise direction, said drive device including a rotatable element mounted on said motor shaft, a second rotatable element, and means for connecting said rotatable elements so that said clockwise motion of the motor shaft is transmitted to said rotatable elements, a member attached to and rotatable with the second-named rotatable element and a second rotatable member associated therewith so as to translate the clockwise motion into anti-clockwise motion, said second rotatable member being mounted on a swingable shaft to transmit said anti-clockwise motion to said shaft, and means on said swingable shaft for transmitting said anti-clockwise motion to the lawn mower blades.

2. A drive device for engagement with a lawn mower to sharpen the blades thereof and including a motor having a shaft rotatable in a clockwise direction, said drive device including a pair of pulleys and means for connecting them and one of said pulleys being mounted on said motor shaft so that said pulleys receive clockwise motion therefrom, a gear wheel attached to one of said pulleys and a second gear wheel associated therewith to translate said clockwise motion into anti-clockwise motion, one of said gear wheels being mounted on a stationary shaft and the other gear wheel being mounted on a rotatable shaft, and connecting means between said gear shafts to permit swinging movement of said rotatable shaft, and a coupling on said swingable shaft to transmit said anti-clockwise motion to the blades of said lawn mower.

3. A drive device for engagement with a lawn mower to sharpen the blades thereof and including a motor having a shaft rotatable in a clockwise direction, said drive device including a pair of pulleys and means for connecting them and one of said pulleys being mounted on said motor shaft so that said pulleys receive clockwise motion therefrom, a gear wheel attached to one of said pulleys and a second gear wheel associated therewith to translate said clockwise motion into anti-clockwise motion, one of said gear wheels being mounted on a stationary shaft and the other gear wheel being mounted on a rotatable shaft, and connecting means between said gear shafts to permit swinging movement of said rotatable shaft, and a coupling on said swingable shaft to transmit said anti-clockwise motion to the blades of said lawn mower; a support for said motor, and means for adjusting said support to increase or decrease the tension of the connecting means between said pulleys.

4. A drive device for engagement with a lawn mower to sharpen the blades thereof and including a motor having a shaft rotatable in a clockwise direction, said drive device including a pair of pulleys and means for connecting them and one of said pulleys being mounted on said motor shaft so that said pulleys receive clockwise motion therefrom, a gear wheel attached to one of said pulleys and a second gear wheel associated therewith to translate said clockwise motion into anti-clockwise motion, one of said gear wheels being mounted on a stationary shaft and the other gear wheel being mounted on a rotatable shaft, and connecting means between said gear shafts to permit swinging movement of said rotatable shaft, and a coupling on said swingable shaft to transmit said anti-clockwise motion to the blades of said lawn mower; a support for said motor, and means for adjusting said support to increase or decrease the tension of the connecting means between said pulleys, said pulleys being of different diameters and said gear wheels being of different diameters to control the speed of rotation transmitted to the blades of said lawn mower.

FREDERICK S. PRICE.

REFERENCES CITED

The following references are of record in the file of this patent:

UNITED STATES PATENTS

| Number | Name | Date |
| --- | --- | --- |
| 1,497,650 | Mead | June 10, 1924 |
| 1,866,794 | Bierman | July 12, 1932 |
| 2,110,637 | Simmons et al. | Mar. 8, 1938 |